Sept. 13, 1966 R. P. ROSS 3,272,490
STEELMAKING FURNACE
Filed Sept. 25, 1963
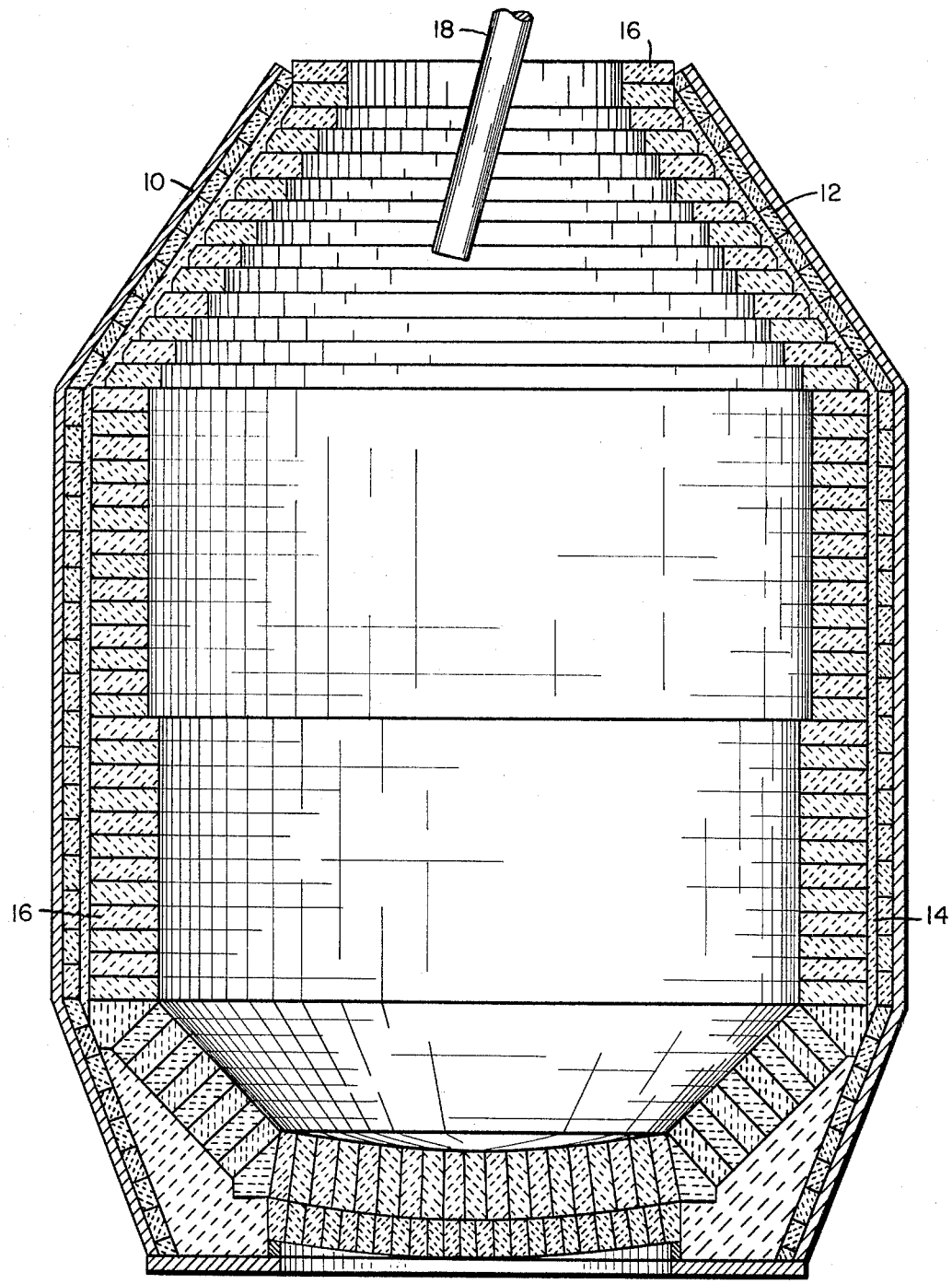
INVENTOR.
Robert P. Ross
BY Clarence R. Patty, Jr.
ATTORNEY 3,272,490
STEELMAKING FURNACE
Robert P. Ross, Louisville, Ky., assignor to Corhart Refractories Company, Louisville, Ky., a corporation of Delaware
Filed Sept. 25, 1963, Ser. No. 311,439
3 Claims. (Cl. 266—35)

This invention relates to basic oxygen steelmaking furnaces, and in particular to such furnaces having a novel refractory working lining. The invention is especially concerned with furnaces used in the Stora-Kaldo process.

A basic oxygen furnace, in broad terms, comprises a substantially pear-shaped steelmaking vessel or converter generally similar to those used in the Thomas or basic Bessemer process developed in 1877, but in which pure oxygen is used instead of air. The Thomas vessels had a basic refractory lining, utilized a basic slag and were bottom blown with air. The modern day basic oxygen furnaces, vessels or converters, developed in the past decade, while continuing the use of a basic refractory lining and a basic slag, commonly differ from the Thomas vessels (in addition to employing oxygen instead of air) in that they are top blown instead of bottom blown. The tuyeres in the bottom of the old Thomas vessels are omitted and instead positively cooled oxygen lances (e.g. water cooled tubing) are positioned downwardly into the open top of the converters or vessels so as to direct the blast of oxygen onto the surface of the molten metal in the converters or vessels. It is these top blown types of basic oxygen furnaces or converters that are used in the now well-known Stora-Kaldo process developed in Sweden. Of course, there are also the side blown types of converters (e.g. Tropenas converters) that might be employed as basic oxygen furnaces when equipped with appropriate basic refractory lining.

The environment in basic oxygen steelmaking furnaces presents a rather severe corrosion and erosion problem for the working linings, particularly for the side wall lining. The more detrimental factors of a Kaldo furnace environment contributing to this problem are: the high temperatures developed by the oxygen blast, the washing action of the molten contents against the refractory lining. Refractories that have been utilized for working linings in these furnaces have been composed of burnt or tar bonded dolomites and magnesites or mixtures thereof. Although these refractories exhibit a relatively modest corrosion-erosion resistance in Kaldo furnace environments, there has developed a great desire on the part of the operators of these furnaces for refractory having a greatly improved corrosion-erosion resistance in order to increase the life of the working linings.

I have now discovered that the life of such working linings can be increased about two-fold or more, in contrast to the burnt or tar bonded type of refractories now used, by constructing the working lining of a chrome-magnesia fused cast refractory material and, accordingly, it is an object of this invention to provide such working lining in a Kaldo basic oxygen furnace. Additional objects, features and advantages of the present invention will become apparent to those skilled in the art, from the following detailed description and the attached drawing, wherein the sole feature is a vertical, cross-sectional view of a representative Kaldo basic oxygen vessel having a working lining made up of the chrome-magnesia fused cast refractory material according to this invention.

As is well known, fused cast refractory is the type of refractory material which is commonly produced by melting a mass of refractory material of the desired composition and then cooling the molten refractory material to form a solidified refractory mass. More commonly, the molten refractory material may be cast and solidified in a mold to form large billets or articles of particular shape. The molten refractory can also be solidified within the same container in which it was melted.

The chrome-magnesia fused cast refractory material for constructing working linings in a Kaldo basic oxygen furnace according to this invention should have a composition consisting of, analytically by weight, 40% to 79% MgO, up to 20% FeO, 4% up to 58% $Cr_2O_3$, up to 35% $Al_2O_3$, up to 10% $TiO_2$, up to 5% $SiO_2$, up to 3% CaO and up to 5% fluorine. Generally, the constituents should be in proportions such that the ratio of moles of RO oxides (i.e. MgO, FeO and CaO) to the sum of the moles of $R_2O_3$ oxides (i.e. $Cr_2O_3$, $Al_2O_3$, $Fe_2O_3$ and $Ti_2O_3$) plus one-half the moles of $SiO_2$ is at least 2.2 and preferably between 2.4 and 15. A particularly suitable composition area consists of, analytically by weight, 55% to 65% MgO, 3% to 15% FeO, 12% to 25% $Cr_2O_3$, up to 10% $Al_2O_3$, 0.4% to 5% $TiO_2$, not more than 3% $SiO_2$, not more than 1.5% CaO and 0.1% to 1.5% fluorine. This refractory material is generally of the type previously known for open hearth furnace service and has a crystalline structure comprising chrome-containing spinel and periclase. When iron oxide is present in the refractory, some or all of it will be in solid solution in the periclase crystals. The spinel is generally of two types: primary spinel crystallizing directly from the molten material between the previously formed periclase crystals and secondary spinel precipitated or exsolved within the periclase crystals. This refractory material is readily manufacturable into substantially crack-free bodies by melting a mixture of suitable raw materials, for example, calcined magnesite and chrome ore. As will be appreciated, relatively high temperatures (e.g. approx. 2000–2700° C.) are required to fuse and melt these compositions. Preferably, conventional electric arc melting furnaces are employed, although any other suitable means can be used as desired. The raw batch materials are suitably proportioned to provide the desired composition and, preferably, are premixed prior to charging into the melting furnace.

The more usual form of the refractory for constructing the novel working linings of Kaldo basic oxygen furnaces according to this invention is that of bricks cast to shape, or cut from billets cast, by pouring the molten batch material into conventional preformed molds of any suitable material, e.g. graphite, bonded sand, or steel, and allowing it to cool and solidify according to conventional practice, for example, as disclosed in United States Patent 1,615,750 to G. S. Fulcher, to which reference may be had. If desired, of course, the novel refractory material can be melted and solidified in the same container. Another variant is to form the molten material into small globules or particles by the known conventional techniques of disintegrating a stream of the molten refractory material and causing these globules or particles to solidify as a mass of fused cast granular material. This granular material is then formed into rebonded bricks of special shape by compacting in a suitable pressure mold and firing to sinter the compacted body.

Referring now to the drawing, the Kaldo basic oxygen furnace or vessel shown comprises a metal shell or tank 10, a permanent or tank lining 12, a rammed refractory interlayer 14, a working lining 16 and a lance 18 for introducing an oxygen blast. The lining 12 and interlayer 14 form a heat insulator to protect shell 10. In this typical illustration, the shell 10 is made of steel. The permanent lining 12 is often made up of burnt magnesia brick and the rammed interlayer 14 is commonly formed of a conventional tar-dolomite ramming mix or a conventional magnesia ramming mix. The working lining 16 is built up of brick or blocks of the above-described fused cast refractory material. The bricks in lining 16 are laid up usually with a conventional type mortar between the bricks.

By way of illustrating and providing a better appreciation of the present invention, the following detailed description and comparative data are given concerning working linings in basic oxygen furnaces like that shown in the drawing.

TABLE I

| Working Lining Material | Working Lining Thickness (inches) | Total Number of Heats For Each Lining |
|---|---|---|
| A | 18 | 90, 82, 154, 156 |
| 1 | 21 | 29, 20, 26 |
| 1 | 24 | 24, 21, 42, 35, 31, 37, 30 |
| 2 | 24 | 40, 34, 10 |
| 3 | 24 | 36, 7, 34, 41, 37, 42, 48, 56, 43, 31, 62, 36, 53, 40, 46, 44 |
| 4 | 24 | 21 |
| 5 | 24 | 50, 47, 46, 45, 40, 29, 28, 22, 30, 15 |
| 6 | 24 | 31 |
| 7 | 21 | 44, 47 |
| 8 | 24 | 20 |
| 9 | 15 | 34 |
| 9 | 20 | 48 |
| 10 | 24 | 34 |
| 11 | 24 | 57 |

The data in Table I are the results of actual commercial operations of the basic oxygen furnace in the manufacture of steel according to the well-known Stora-Kaldo process. The refractory brick materials used to construct the working linings are as follows:

A-bricks cut from fused cast refractory billets having the following typical chemical analysis: 58% MgO, 12% FeO, 19% $Cr_2O_3$, 7% $Al_2O_3$, 0.5% $TiO_2$, 2.2% $SiO_2$, 1% CaO and 0.3% fluorine.

(1) Tar bonded dolomite bricks made with coarse and fine fractions of burnt stabilized dolomite and bonded with 6% coal tar pitch.

(2) Bricks similar to No. 1 with exception that the fine fraction is magnesia rather than dolomite.

(3) Tar bonded magnesia brick made from high purity magnesia grain which has been pelletized and burned in a shaft kiln at high temperatures to give dense particles.

(4) Commercial tar bonded basic brick of uncertain dolomite or magnesite material.

(5) Tar bonded magnesite brick which has been precoked at 500°–1000° F. to drive off the volatiles in the tar used for bonding.

(6) Commercial tar bonded basic brick of uncertain basic grain material composition which has been precoked as described above for No. 5.

(7) Burned high magnesite brick fired at approximately 2800–2900° F.

(8) Commercial tar bonded basic brick of uncertain basic grain composition.

(9) Burned 80% magnesite-20% chrome ore brick fired at approximately 3100–3300° F.

(10) Medium burned high magnesia and tar impregnated brick.

(11) Brick like No. 10 above, but burned harder.

It is readily apparent from Table I that the basic Kaldo oxygen furnace working linings constructed of refractory material A according to the present invention last for two to five or more times longer than the prior burned and tar bonded basic bricks. Moreover, these results on the chrome-magnesia fused cast refractory working linings were for linings of lesser original thickness than the prior burned and tar bonded refractory lining (except for the one No. 9 lining). The unexpected superior character of the Kaldo basic oxygen furnace working linings according to the present invention is particularly evident in comparing the results of the working lining material A and working lining material 9, the latter also being a magnesia-chrome ore composition and burned at extremely high temperatures to produce a very dense material with very substantial high temperature strength, somewhat approaching the characteristic properties of working lining material A.

As used in this specification and the following claims, the terms "analytically" means that the content of oxides of various metals and metalloids in the refractory are calculated, respectively, in terms of the specific oxide compounds indicated, e.g. $TiO_2$, FeO, etc., although they may not exist in the fused cast refractory in the form or oxidation state of such compounds. Thus, for example, titanium oxide could be present in an oxidation state to form TiO or, more usually, $Ti_2O_3$. Likewise, iron oxide could be present in an oxidation state to form $Fe_2O_3$.

Although the present invention has been described with respect to specific details of certain embodiments thereof, it is not intended that such details be limitations upon the scope of the invention except insofar as set forth in the claims.

I claim:

1. In a basic oxygen furnace comprising a generally pear-shaped tank, refractory lining covering the internal surfaces of said tank and means for providing an oxygen blast directed into said refractory lined tank, the improvement comprising a chrome-magnesia fused cast refractory material forming at least part of said refractory lining and having a composition consisting of, analytically by weight, 40% to 79% MgO, up to 20% FeO, 4% to 58% $Cr_2O_3$, up to 35% $Al_2O_3$, up to 10% $TiO_2$, up to 5% $SiO_2$, up to 3% CaO and up to 5% fluorine.

2. In a basic oxygen furnace comprising a generally pear-shaped tank, insulating refractory lining covering the internal surface of said tank, working refractory lining covering the internal surface of said tank, working refractory lining covering the internal surfaces of said insulating refractory lining and means for providing an oxygen blast directed into said refractory lined tank, the improvement comprising a chrome-magnesia fused cast refractory material forming at least part of said working refractory lining and having a composition consisting of, analytically by weight, 40% to 79% MgO, up to 20% FeO, 4% to 58% $Cr_2O_3$, up to 35% $Al_2O_3$, up to 10% $TiO_2$, unp to 5% $SiO_2$, up to 3% CaO and up to 5% fluorine.

3. A basic oxygen furnace according to claim 2 wherein said chrome-magnesia fused cast refractory material forms the entire working refractory lining.

References Cited by the Examiner

UNITED STATES PATENTS

| 2,690,974 | 10/1954 | Magri | 106—59 |
| 3,058,834 | 10/1962 | Korhegyi | 106—59 |
| 3,117,881 | 1/1964 | Henry et al. | 106—52 |

OTHER REFERENCES

Holt, J. "Tar Bonds Oxygen Vessel Bricks." In Steel, vol. 143, pp. 74–78, July 7, 1958.

JOHN F. CAMPBELL, *Primary Examiner.*

JAMES H. TAYMAN, JR., *Examiner.*

J. J. MULLEN, J. M. ROMANCHIK,
*Assistant Examiners.*